April 5, 1932.   E. N. HESCOCK   1,852,079
CABLE REEL
Filed Dec. 18, 1929

Ethan N. Hescock
INVENTOR

BY Alanby Johnson
ATTORNEY

Patented Apr. 5, 1932

1,852,079

UNITED STATES PATENT OFFICE

ETHAN N. HESCOCK, OF WESTFIELD, NEW JERSEY, ASSIGNOR TO HENRY B. NEWHALL CORPORATION, OF GARWOOD, NEW JERSEY, A CORPORATION OF NEW JERSEY

CABLE REEL

Application filed December 18, 1929. Serial No. 414,914.

My invention relates to strong metal cable reels for heavy cable, heavy wire, wire rope or similar material.

My invention further relates to such a cable reel provided with means to hold the end of the cable, heavy wire, wire rope or similar material, and protect it from injury, while the cable is being wound upon the drum of the reel.

My invention further relates to combinations, sub-combinations, articles of manufacture, and details of construction, which will be more fully hereinafter described in the specification and pointed out in the claims.

In the accompanying drawings showing an illustrative embodiment of my invention, and in which the same reference numerals refer to similar parts in the several figures:—

Figure 1:
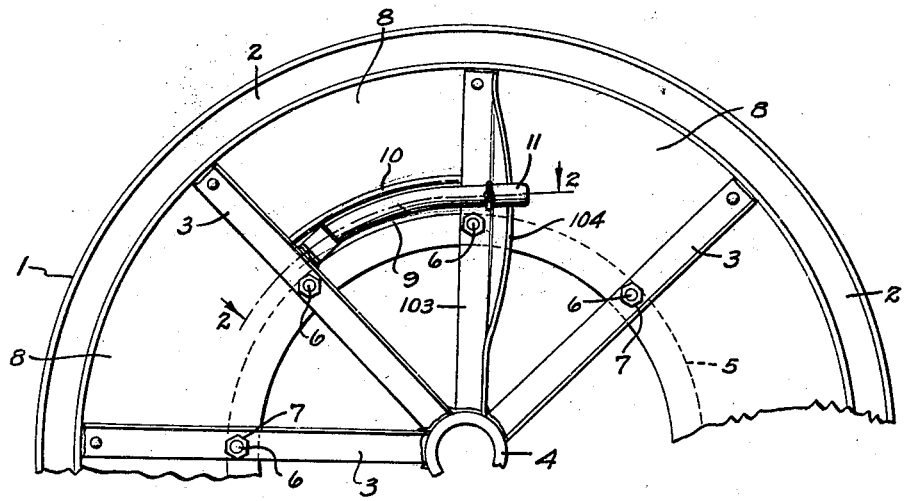
Figure 1 is a fragmentary side elevation of one form of cable reel equipped with my invention.
Figure 2:
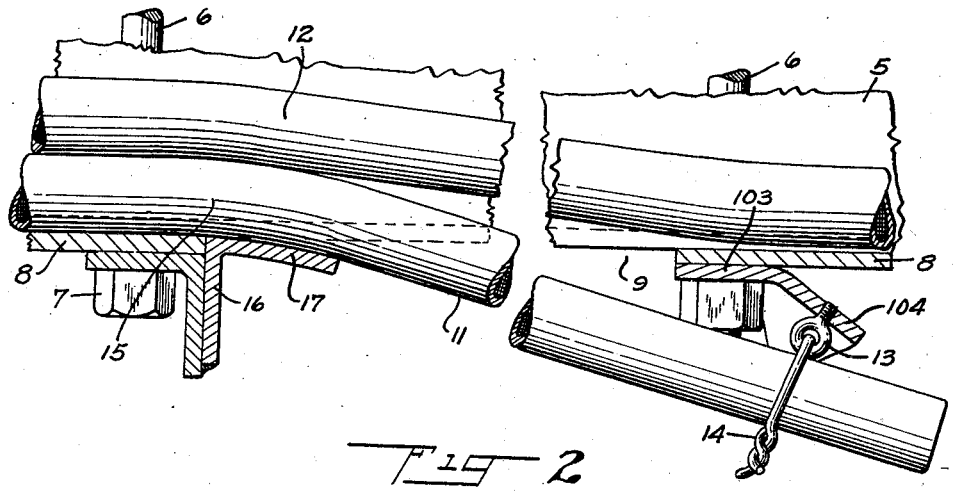
Figure 2 is an arcuate section on line 2—2 of Figure 1, on an enlarged scale, looking in the direction of the arrows.

Cable reels are used to hold heavy lead covered cable, heavy wire, wire rope, or other heavy material which can be wound upon the drum reels at the place of manufacture, and then the loaded cable reel is transported, in any suitable manner, to the location where the cable, wire, wire rope, or other material is to be used. To wind and unwind the cable, or other material from the reel, the reel is jacked up and temporarily supported so that it may rotate on a temporary axle passed through the hub of the heads. For short distances, to get the cable reel into its proper position, it is sometimes customary to use the heads of the reel as wheels.

In the case of a cable great care must be taken not to bend any portion of it to a radius that will injure the covering, or the insulated wires of which it is formed. For purposes of description I have termed this the critical angle. Not bending beyond the critical angle applies not only to that portion of the cable wound on the drum of the reel, but to any portion of the cable which may be held, while the remaining portion is wound on the drum.

My invention relates more particularly to any form of cable reel equipped with my invention to protect the tying end of the cable.

For purposes of description I have shown my invention in connection with one form of cable reel, though it is to be understood that this is merely illustrative.

In the form of reel illustrated, 1 is a cable reel formed of a bent I beam to form the rim or felloe 2. To this rim or felloe are secured angle iron spokes 3 preferably by welding. The other ends of the spokes 3, 3 are welded to a short piece of pipe 4, as well as to each other, to form the hub construction of one head; it being understood that two such heads, with an interposed drum 5 are employed to form each cable reel. The heads and drum are held together by the through bolts 6, 6 and nuts 7, 7.

To protect the cable, segmental side or lining plates 8, 8 are employed. One of the plates 8 is cut away to form an arcuate slot 9. The portion of the plate nearest the hub 4 is bent back on itself to form a bead 10, Figure 1, so as not to cut or mar the tying end 11 of the cable 12.

In winding the cable 12 on the drum 5 of the reel 1, the reel is jacked up to permit it to revolve and at the same time wind the cable upon the drum 5. The tying end 11 is threaded through the arcuate slot 9 and secured to one of the angle iron spokes 103, in any suitable manner, as by aid of the eye bolt 13 and wire 14 or other securing means.

I provide my reel with means to prevent the end 11 of the cable being bent at such an angle as to either cut or otherwise mar the lead covering, or injure the insulation of the wires forming the cable. It is usually considered by telephone and telegraph engineers that it is injurious for any portion of a lead covered cable to be bent at a ratio of less than 8″ radius to 1″ of diameter of cable. By my invention I prevent the tying end of the cable from being bent beyond this ratio.

When the tying end 11 is threaded through the side arcuate slot 9 the cable would be unduly bent at 15 if I did not provide means to prevent it. I therefore secure, usually by welding, an angle iron 16 to the angle iron spoke 3 adjacent to the arcuate slot 9. This angle iron has a curved shelf 17 which supports the end 11 of the cable at the proper angle for it to be secured to the adjacent angle iron spoke 103. This spoke 103 is the same as the other spokes 3, 3, except that its flange 104 has been bowed out, or bent, to clear the end 11 of the cable, and permit an eye bolt 13 to be secured to it out of the path of the protruding tying end 11 of the cable.

It will be seen that when the end 11 of the cable 12 is threaded through the side arcuate slot 9 it can be secured to the eye bolt 13, by the wire 14 or other securing medium, the cable following a gentle angle and one which will not injure either the lead covering or the insulation of the wires forming the cable.

After the cable has been wound on the drum of the reel and has been shipped to its destination, the entire cable, including the tying end 11, can be employed on the job, thereby making a material saving.

It is of course to be understood that suitable lagging is employed, but as that forms no part of my invention it is not illustrated or described.

Having thus described my invention in connection with an illustrative embodiment thereof, to the details of which I do not desire to be limited, what is claimed as new and what is desired to secure by Letters Patent is set forth in the appended claims.

What I claim is:

1. In a cable reel the combination of a drum, heads, spokes, side plates provided with an arcuate slot for the tying end of a cable, means to secure the end of a cable to one spoke, and means to prevent the adjacent spoke cutting or marring the tying end of a cable.

2. In a cable reel the combination of a drum, heads, angle iron spokes, side plates provided with an arcuate slot for the tying end of a cable, a shelf secured to one angle iron spoke, the adjacent angle iron spoke having its outwardly extending flange bent, and a fastening means secured to said flange out of the line of the tying end, thereby permitting the tying end to be secured to the reel without subjecting any portion of it to a critical or damaging strain.

ETHAN N. HESCOCK.